Jan. 20, 1970  R. O. GORDON  3,490,606
HYDRAULIC CONTROL SYSTEM FOR MATERIAL HANDLING EQUIPMENT
Filed June 7, 1968  3 Sheets-Sheet 1

INVENTOR:
RICHARD O. GORDON
BY: James E. Nilles
ATTORNEY

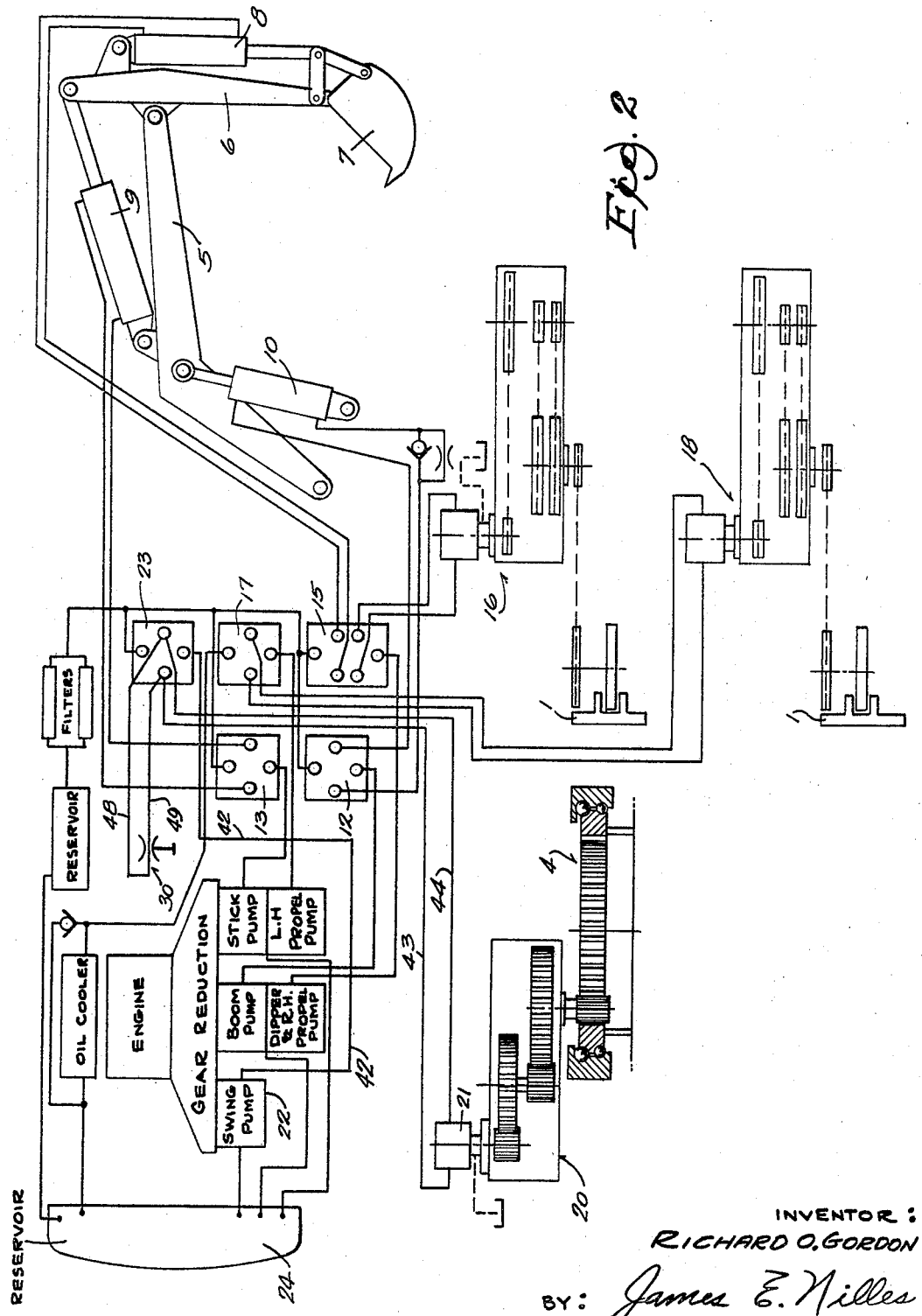

INVENTOR:
RICHARD O. GORDON
BY: James E. Nilles
ATTORNEY

United States Patent Office 3,490,606
Patented Jan. 20, 1970

3,490,606
HYDRAULIC CONTROL SYSTEM FOR MATERIAL HANDLING EQUIPMENT
Richard O. Gordon, Mequon, Wis., assignor to Harnischfeger Corporation, Milwaukee, Wis., a corporation of Wisconsin
Filed June 7, 1968, Ser. No. 735,372
Int. Cl. B66c 23/86; B66f 9/00; E02f 3/30
U.S. Cl. 212—66  14 Claims

ABSTRACT OF THE DISCLOSURE

A hydraulic control system for adjusting and controlling the swing characteristics of the upper, rotatable platform or turret of material handling equipment such as cranes or hoes. The hydraulic system includes an adjustable valve which can be set or "dialed" by the machine operator to provide the desired swing acceleration and deceleration.

BACKGROUND OF THE INVENTION

The invention pertains to hydraulic control systems of the type having a hydraulic "swing" motor for rotating the upper portion of a crane, shovel, hoe, or the like, about a vertical axis. The conventional swing motor is controlled by the machine operator from the cab of the machine, and the load, such as structural steel being swung into place many feet above the ground by a truck crane, or such as a bucket full of earth by a back-hoe, is swung horizontally in either direction. The swinging motion of the load must be carefully controlled in many instances and with the increasingly heavier loads and larger machines being employed, the acceleration, deceleration and general precise control of these swinging loads become critical.

Many devices have been tried in hydraulic systems for equipment of the above nature in an attempt to accommodate these heavier loads and prevent violent shock loads on the various parts of the machine and its hydraulic system. Various relief valves have been used, for example, of the spring operated or pilot operated type, for the purpose of by-passing or relieving the fluid pressure build-up in the circuit. These systems are not only noisy and complicated, but require valves and components of such size and number that they have become impractical. Furthermore, the prior art systems have not provided the accuracy, ease of control and dependability which is essential in these systems.

SUMMARY OF THE INVENTION

The present invention provides a hydraulic control system for controlling the acceleration and deceleration of the upper, rotatable portion of material handling equipment such as cranes, earth moving equipment, or the like. More specifically, the control system includes a hydraulic swing motor and an adjustable bypass valve in the circuit, which is selectively resettable by the machine operator to precisely control the swing characteristics. Not only can acceleration and deceleration be controlled, but free swing, partially free swing or no free swing is provided.

These and other objects and advantages of the present invention will appear as this disclosure progresses, reference being had to the accompanying drawings.

BRIEF DESCRIPTION OF THE DRAWINGS

FIGURE 2 is a generally schematic diagram of the hydraulic system of the present invention and the gear transmission for a back hoe;

DESCRIPTION OF THE PREFERRED EMBODIMENT

The invention will be described as applied to a truck mounted, earth working back hoe, but it will be appreciated that the invention is applicable to many other types of machinery, such as cranes, for example.

Figure 1:
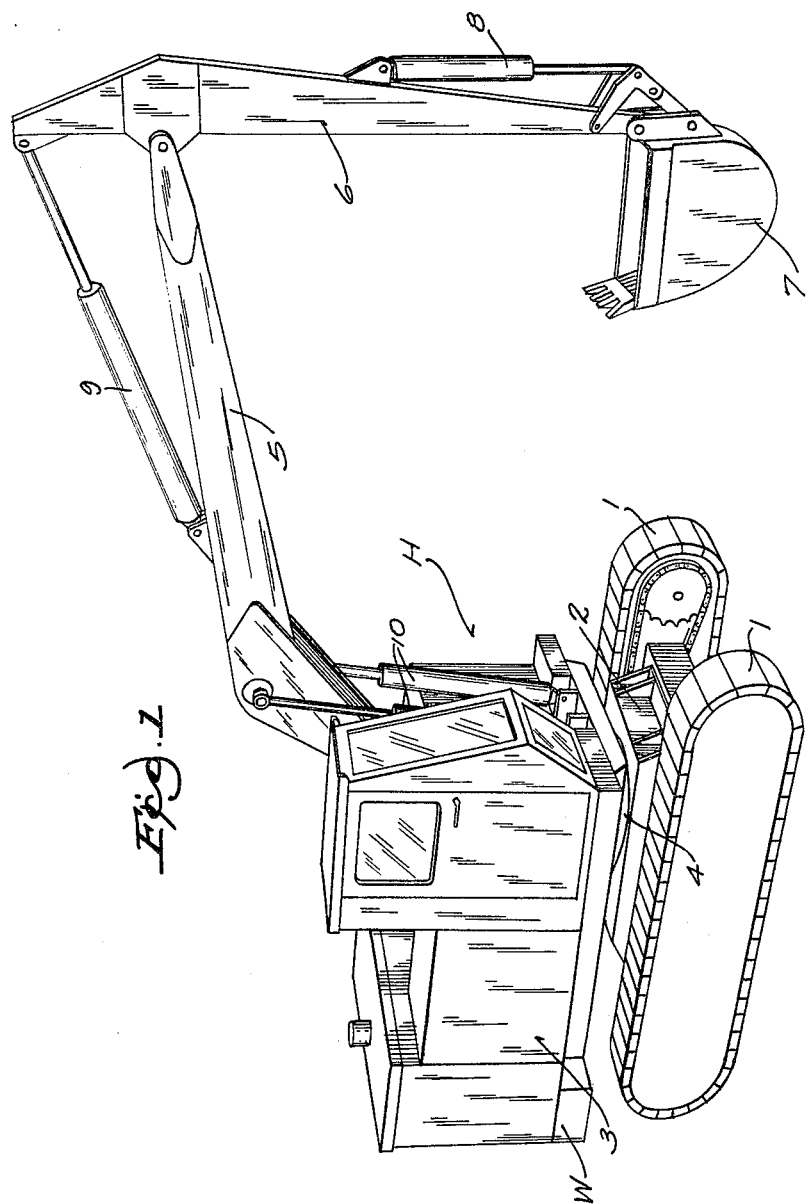
FIGURE 1 is a view of a back hoe of the type utilizing the present invention.

FIGURE 1 is a perspective view showing an earth working back hoe H having a pair of ground engaging endless tracks 1 mounted on a lower chassis 2, and also having an upper portion 3 which is mounted on the lower chassis for rotation about a vertical axis by means of conventional slewing rim means 4. A boom 5 is pivotally mounted on the upper portion 3 for horizontally swinging therewith in either direction. A dipper stick 6 is pivotally attached to the boom and has a dipper 7 pivotally attached at its free end. A heavy counterweight W is attached to the opposite side of portion 3.

Double acting hydraulic cylinder means 8, 9 and 10 are provided, respectively, for the dipper, stick and boom, and extension and retraction of these cylinder means serve to actuate their respective parts in the known manner.

Conventional hydraulic control valve means 12 and 13 are provided in the circuit for controlling, respectively, the cylinder means 10 and 9 of the boom and stick. A double hydraulic control valve means 15 is provided in the circuit as shown in FIGURE 2 for controlling either the cylinder means 8 of the dipper or a propel unit 16 of one of the endless tracks 1. Another control valve 17 controls the other propel unit 18 of the other endless track 1.

The upper portion 3 of the machine is rotated about a vertical axis in either direction by the slewing rim means 4, from a transmission 20 driven by a hydraulic motor 21. Motor 21 is referred to as the "swing" motor. Pressure fluid to motor 21 from the large fluid pump 22 is controlled by the swing control valve 23. The fluid sump or tank 24 provides the pump with fluid, and suitable coolers, filters, and pumps may be provided for the various functions as indicated.

An adjustable control valve 30 is also provided in the circuit and is located adjacent the operator of the machine, for example, in the cab C of the machine. This by-pass valve is of the needle type and a dial 31 is provided on the adjustable needle 32 (FIGURE 3) of the valve so that the position of the valve can be set by the operator for optimum conditions.

Figure 3:
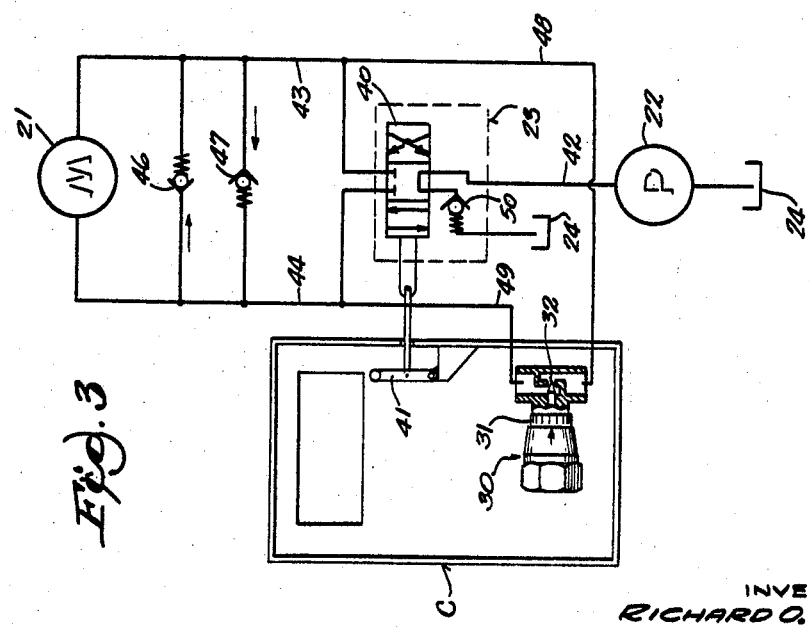
FIGURE 3 is a schematic hydraulic circuit of only a portion of the circuit of FIGURE 2 and as it relates to the swing motor.

Referring in greater detail to the circuit as shown in FIGURE 3, the control valve 23 includes a shiftable spool 40 which is mechanically connected to and shiftable by a lever 41 located adjacent the operator. By shifting the lever in one direction or another, the operator can admit fluid pressure from pump 22, via conduit 42, and selectively to either conduit 43 or 44 and to motor 21, to thereby swing the upper portion 3 of the machine in one direction or the other.

A pair of relief or cross-over valves 46 and 47, of the spring loaded, one-way check ball type, are provided in the circuit and permit flow of fluid in the direction indicated by the arrows in FIGURE 3, when the pressure in conduit 44 or 43, respectively, exceeds a predetermined amount. For example, assume pump 22 delivers 36 gallons per minute at a pressure of 2100 pounds per square inch, the relief valves 46 and 47 would be set to open at about 2300 p.s.i.

Valves 46 and 47, and valve 50 (in FIGURE 3) are built into control valve means 23 and therefore are not shown separately in FIGURE 2.

Referring again to the adjustable needle valve 30, it is in fluid communication with the conduits 43 and 44 through conduits 48 and 49.

A main relief valve 50 may also be provided in the circuit between the pump 22 and control valve 23, and is set to dump into the tank when, for example, the pressure in conduit 42 exceeds 2100 p.s.i.

The operation of the swing circuit is as follows. Assume the operator desires to swing the upper portion 3 of the machine in one direction and moves lever 41 accordingly. The control valve spool 40 is thus shifted to permit fluid pressure to enter conduit 44, turning the swing motor 21 in one direction. The heavy load, including not only the weight of the upper portion 3 and its counterweight W, and the weight of the material in the bucket, but also the momentum of the total weight, imposes tremendous shock loads on the hydraulic system and on the machine parts. For example, as fluid is admitted to the motor 21, considerable inertia must be overcome in order to begin moving the load and the load should be accelerated smoothly. When the load is to be slowed in its swinging movement and stopped, such should also be done smoothly to avoid excessive shock loads and excessive swinging of the load.

Assume for example that pressure fluid is being admitted to conduit 44 and the motor 21 has begun to swing the load. When the operator wishes to stop further swinging, he shifts valve spool 40 to neutral to cut off fluid flow to conduit 44. The swinging, heavy load, however, has tremendous inertia and causes motor 21 to act as a pump, and excessive pressure builds up in conduit 43, causing valve 47 to open and some fluid is routed back to conduit 44. Thus, spring returned, relief valves 46 and 47 have been provided to open when excessive pressure develops in conduits 44 or 43, respectively, to thereby permit some of the fluid to be diverted to the other conduit.

These relief, cross-over valves 46 and 47 have been satisfactory to some extent in the past, but have not been suitable with the advent of heavier loads for the reasons previously mentioned. Their size and noise not only become prohibitive, but they cannot provide accurate, smooth and predictable control of the swinging load.

The adjustable needle control valve 30 provides the operator with a manual adjustment whereby he can set the amount of excessively high pressure fluid which can be diverted from conduit 43 to 44, or vice versa depending on which direction of swing is taking place. With the capacity of the pump 22 being at about 36 gallons per minute as previously indicated, the valve 30 may be capable, for example, of diverting 6 gallons per minute. By placing the settable valve 30 in the circuit across the fluid inlet and outlet of the swing motor 21, the operator can conveniently set the rate of acceleration or deceleration of the load. For example, if the swing is too rapid or abrupt, the operator opens the needle 32 additionally and thereby diverts more fluid from the excessively high pressure conduit, either 43 or 44 to the other, and eliminates pressure fluctuations due to the motor and valves 46 and 47.

As previously mentioned, a calibrated or marked dial 31 is provided on valve 30 so the operator can visually determine the setting of the needle valve 32, the correct position of which, for the load involved, can be readily determined and set. In effect, the operator, by simply turning the needle, can dial the desired rate of load acceleration or deceleration if he so chooses. This smooth and accurate swinging of the load is particularly important when the operator is "inching" a load of structural steel, for example, into place on an adjacent structure, many feet above the ground.

FIGURE 4

Figure 4:
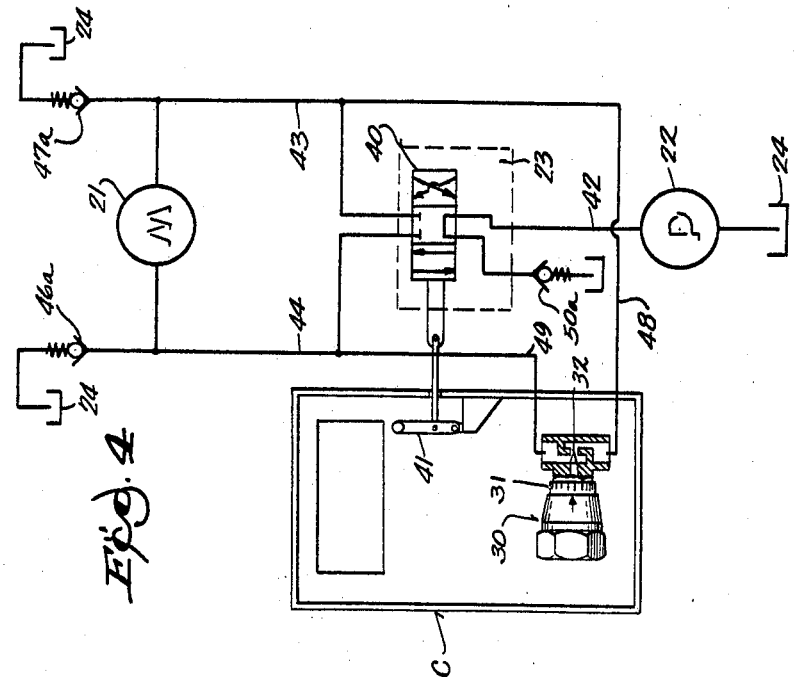
FIGURE 4 is a modification of the FIGURE 3 device.

The system shown in FIGURE 4 is essentially the same as shown in FIGURE 3, except that the cross-over relief valves 46 and 47 have been replaced by relief valves 46a and 47a which dump excessive pressure fluid directly to the sump 24. The main relief valve 50 would also be replaced by a larger external main relief valve 50a. In FIGURE 4, valves 46a, 47a, and 50a are located externally of the control valve 23. These direct-dumping relief valves 46a and 47a are particularly desirable in extremely large machines where the operator has a tendency for operating by means of "plugging" in order to slow down the swinging load. That is to say, assume pressure is being admitted to conduit 44 to swing the load and the operator then desires to stop or slow the swinging movement, he would then admit fluid pressure to the other side of motor 21 via conduit 43. Such a "plugging" procedure throws considerable shock on the system, and the excessive pressure fluid is dumped quickly and directly to the sump by the direct dumping relief valve 46a and 50a. The by-valve 30 is continuously bleeding and aids in the dumping of the fluid and stops chatter of the relief valves. The result is a quiet and smooth swing.

Résumé

The rate of acceleration or deceleration can be adjusted, and furthermore free swing can be provided by fully opening the adjustable bypass valve 30 so that free swing is provided during the last part of the swing in either accelerating or decelerating directions. Also by fully closing the adjustable by-pass valve 30, the operator is able to directly control the swing by the control valve 23.

With the present invention, hydraulic shock loads are eliminated from the machine's entire swing system, greatly extending the life of the swing pump and motor as well as the swing gearing. Even an inexperienced operator can achieve rapid and smooth swings without abuse to the system.

I claim:

1. In a material handling machine of the type having an upper portion which is mounted for rotational movement about a vertical axis, and a material handling boom means extending outwardly from said upper portion for horizontal swinging therewith; a fluid pressure hydraulic system on said machine and including, a swing motor for horizontally swinging said upper portion in one direction or the other, a control valve, a pair of conduits between said control valve and said motor for conducting pressure fluid to and from said motor to operate the latter, a pair of one-way check relief valves for relieving excessive pressure in either conduit, and a variable orifice by-pass valve connected between said conduits for by-passing a portion of the pressure fluid from one conduit to the other and thereby vary the rate of swing of said upper portion.

2. A machine according to claim 1 further characterized in that said by-pass valve is manually settable to vary the amount of fluid by-passed from one conduit to the other, and said by-pass valve is located adjacent the machine operator.

3. The machine set forth in claim 2 further characterized in that said by-pass valve is of the needle type, and an indicating dial means which is visible to said operator for visually determining the setting of said by-pass valve.

4. The machine as claimed in claim 1 further characterized in that said one-way relief check valves are located between said pair of conduits.

5. The machine as described in claim 1 further characterized in that said control valve is manually actuated, and including control means located adjacent the machine operator for manually actuating said control valve to swing said upper portion in one direction or the other.

6. A machine according to claim 5 further characterized in that said by-pass valve is manually settable to vary the amount of fluid by-passed from one conduit to the other, and said by-pass valve is located adjacent the machine operator.

7. A machine as set forth in claim 6 further characterized in that said by-pass valve when fully opened provides free swing below a predetermined rate of swing.

8. A machine as set forth in claim 6 further characterized in that said by-pass valve when fully closed provides direct control by said control valve.

9. The machine as set forth in claim 6 further characterized in that said by-pass valve is of the needle type, and an indicating dial means which is visible to said operator for visually determining the setting of said by-pass valve.

10. The machine as claimed in claim 5 further characterized in that said one-way relief check valves are located between said pair of conduits.

11. In a material handling machine of the type having an upper portion which is mounted for rotational movement about a vertical axis, and a material handling boom means extending outwardly from said upper portion for horizontal swinging therewith; a fluid pressure hydraulic system on said machine and including, a swing motor for horizontally swinging said upper portion in one direction or the other, a control valve, a pair of conduits between said control valve and said motor for conducting pressure fluid to and from said motor to operate the latter, a pair of one-way relief check valves for relieving excessive pressure in either conduit, an adjustable by-pass valve connected between said conduits for by-passing a portion of the pressure fluid from one conduit to the other, said by-pass valve being located adjacent the machine operator and adjustable thereby, and indicating dial means adjacent said by-pass valve to visually indicate the setting of said by-pass valve to said operator.

12. A machine as defined in claim 11 further characterized in that said one-way check valves are located between said conduits for conducting excessive pressure therebetween.

13. A machine as set out in claim 11 further characterized in that said control valve is manually actuated, and including control means located adjacent the machine operator for manually actuating said control valve to control the rate of swing of said upper portion in one direction or the other.

14. A material handling machine comprising, an upper portion swingably mounted about a vertical axis, load carrying boom means extending outwardly from said upper portion for horizontal swinging therewith, a fluid pressure hydraulic system including, a swing motor for swinging said upper portion, a control valve, a pair of conduits between said control valve and said motor for conducting pressure fluid to and from said motor to operate the latter, a pair of one-way check relief valves for relieving excessive pressure in either conduit, and a variable orifice by-pass valve connected between said conduits for by-passing a portion of the pressure fluid from one conduit to the other and thereby vary the rate of swing of said upper portion.

References Cited
UNITED STATES PATENTS

| | | | |
|---|---|---|---|
| 2,801,013 | 7/1957 | Pilch | 214—138 |
| 3,156,098 | 11/1964 | La Rou | 214—138 X |

HUGO O. SCHULZ, Primary Examiner

U.S. Cl. X.R.

214—138